US008213973B2

(12) United States Patent
Lu et al.

(10) Patent No.: US 8,213,973 B2
(45) Date of Patent: Jul. 3, 2012

(54) METHOD FOR TRANSMITTING DATA

(75) Inventors: Meng-Cheih Lu, Tanzih Township, Taichung County (TW); Kuang-Chieh Chen, Taichug (TW)

(73) Assignee: Universal Scientific Industrial Co., Ltd., Nan-Tou (TW)

( * ) Notice: Subject to any disclaimer, the term of this patent is extended or adjusted under 35 U.S.C. 154(b) by 1182 days.

(21) Appl. No.: 12/007,910

(22) Filed: Jan. 17, 2008

(65) Prior Publication Data

US 2009/0184813 A1    Jul. 23, 2009

(51) Int. Cl.
H04B 7/00    (2006.01)
(52) U.S. Cl. ........... 455/500; 455/39; 340/442; 340/447
(58) Field of Classification Search .................. 455/500, 455/39; 340/442, 447
See application file for complete search history.

(56) References Cited

U.S. PATENT DOCUMENTS

| | | | |
|---|---|---|---|
| 6,661,351 B1 * | 12/2003 | Matsushiro | 340/12.5 |
| 2002/0191534 A1 * | 12/2002 | Silvers et al. | 370/206 |
| 2005/0242936 A1 * | 11/2005 | Watabe | 340/442 |
| 2006/0023749 A1 * | 2/2006 | Yoshizawa et al. | 370/470 |
| 2006/0044134 A1 * | 3/2006 | Elliott | 340/539.23 |
| 2006/0049923 A1 * | 3/2006 | Miyazaki | 340/426.33 |
| 2006/0052920 A1 * | 3/2006 | Watabe | 701/29 |
| 2006/0176164 A1 * | 8/2006 | Osumi et al. | 340/444 |
| 2006/0195233 A1 * | 8/2006 | Ogawa et al. | 701/2 |
| 2006/0232391 A1 * | 10/2006 | Nakatani et al. | 340/447 |
| 2006/0251042 A1 * | 11/2006 | Mikami | 370/345 |
| 2007/0252685 A1 * | 11/2007 | Oda et al. | 340/447 |
| 2007/0279203 A1 * | 12/2007 | Thomas et al. | 340/447 |
| 2008/0062004 A1 * | 3/2008 | Hammerschmidt | 340/870.01 |
| 2008/0100429 A1 * | 5/2008 | Luo et al. | 340/447 |
| 2008/0157950 A1 * | 7/2008 | Mori et al. | 340/438 |
| 2009/0009311 A1 * | 1/2009 | Escarpit | 340/447 |
| 2009/0160632 A1 * | 6/2009 | Mori et al. | 340/447 |

* cited by examiner

*Primary Examiner* — Nay A Maung
*Assistant Examiner* — Erica Fleming-Hall
(74) *Attorney, Agent, or Firm* — Rosenberg, Klein & Lee

(57) ABSTRACT

A method for transmitting data is applied to a receiver and a plurality of transmitters. The steps comprise respectively transmitting a data to the receiver at different first transmission times within a transmission interval by the transmitters. Next, the different first transmission times are respectively added with different accumulated values to become the different second transmission times. The different accumulated values are respectively added with a multiple of the different first transmission times. Finally, the transmitters respectively transmit a next data to the receiver at the different second transmission times within a next transmission interval.

13 Claims, 3 Drawing Sheets

| T | ID1 R | ID1 A | ID2 R | ID2 A | ID3 R | ID3 A | ID4 R | ID4 A |
|---|---|---|---|---|---|---|---|---|
| 0 | R1 | 5 -A1- =- 5 | R1 | 7 -A1- =- 7 | R1 | 9 -A1- =- 9 | R1 | 11 -A1- =-11 |
| 2 | R2 | 10 -A2- =-10 | R2 | 14 -A2- =-14 | R2 | 18 -A2- =-18 | R2 | 22 -A2- =-22 |
| 4 | R3 | 20 -A3- =-15 | R3 | 28 -A3- =-21 | R3 | 36 -A3- =-27 | R3 | 44 -A3- =-33 |
| 6 | 35 | 20 | 49 | 28 | 63 | 36 | 77 | 44 |
| 8 | 55 | 25 | 77 | 35 | 99 | 45 | 1 | 55 |
| 10 | 80 | 30 | 112 | 42 | 24 | 54 | 56 | 66 |
| 12 | 110 | 35 | 34 | 49 | 78 | 63 | 2 | 77 |
| 14 | 25 | 40 | 83 | 56 | 21 | 72 | 79 | 88 |
| 16 | 65 | 45 | 19 | 63 | 93 | 81 | 47 | 99 |
| 18 | 110 | 50 | 82 | 70 | 54 | 90 | 26 | 110 |
| 20 | 40 | 55 | 32 | 77 | 24 | 99 | 16 | 121 |
| 22 | 95 | 60 | 109 | 84 | 3 | 108 | 17 | 132 |
| 24 | 35 | 65 | 73 | 91 | 111 | 117 | 29 | 143 |
| 26 | 100 | 70 | 44 | 98 | 108 | 126 | 52 | 154 |
| 28 | 50 | 75 | 22 | 105 | 114 | 135 | 86 | 165 |
| 30 | 5 | 80 | 7 | 112 | 9 | 144 | 11 | 176 |
| 32 | 85 | 85 | 119 | 119 | 33 | 153 | 67 | 187 |
| 34 | 50 | 90 | 118 | 126 | 66 | 162 | 14 | 198 |
| 36 | 20 | 95 | 4 | 133 | 108 | 171 | 92 | 209 |
| 38 | 115 | 100 | 17 | 140 | 39 | 180 | 61 | 220 |
| 40 | 95 | 105 | 37 | 147 | 99 | 189 | 41 | 231 |

| T | ID1 R | ID1 A | | ID2 R | ID2 A | | ID3 R | ID3 A | | ID4 R | ID4 A |
|---|---|---|---|---|---|---|---|---|---|---|---|
| | R1 | | R1 | | | R1 | | | R1 | | |
| | R2 | | R2 | | | R2 | | | R2 | | |
| | R3 | | R3 | | | R3 | | | R3 | | |
| 0 | 5 | A1→5 | | 7 | A1→7 | | 9 | A1→9 | | 11 | A1→11 |
| 2 | 10 | A2→10 | | 14 | A2→14 | | 18 | A2→18 | | 22 | A2→22 |
| 4 | 20 | A3→15 | | 28 | A3→21 | | 36 | A3→27 | | 44 | A3→33 |
| 6 | 35 | 20 | | 49 | 28 | | 63 | 36 | | 77 | 44 |
| 8 | 55 | 25 | | 77 | 35 | | 99 | 45 | | 1 | 55 |
| 10 | 80 | 30 | | 112 | 42 | | 24 | 54 | | 56 | 66 |
| 12 | 110 | 35 | | 34 | 49 | | 78 | 63 | | 2 | 77 |
| 14 | 25 | 40 | | 83 | 56 | | 21 | 72 | | 79 | 88 |
| 16 | 65 | 45 | | 19 | 63 | | 93 | 81 | | 47 | 99 |
| 18 | 110 | 50 | | 82 | 70 | | 54 | 90 | | 26 | 110 |
| 20 | 40 | 55 | | 32 | 77 | | 24 | 99 | | 16 | 121 |
| 22 | 95 | 60 | | 109 | 84 | | 3 | 108 | | 17 | 132 |
| 24 | 35 | 65 | | 73 | 91 | | 111 | 117 | | 29 | 143 |
| 26 | 100 | 70 | | 44 | 98 | | 108 | 126 | | 52 | 154 |
| 28 | 50 | 75 | | 22 | 105 | | 114 | 135 | | 86 | 165 |
| 30 | 5 | 80 | | 7 | 112 | | 9 | 144 | | 11 | 176 |
| 32 | 85 | 85 | | 119 | 119 | | 33 | 153 | | 67 | 187 |
| 34 | 50 | 90 | | 118 | 126 | | 66 | 162 | | 14 | 198 |
| 36 | 20 | 95 | | 4 | 133 | | 108 | 171 | | 92 | 209 |
| 38 | 115 | 100 | | 17 | 140 | | 39 | 180 | | 61 | 220 |
| 40 | 95 | 105 | | 37 | 147 | | 99 | 189 | | 41 | 231 |

FIG. 3

METHOD FOR TRANSMITTING DATA

BACKGROUND OF THE INVENTION

1. Field of the Invention

The present invention relates to a method for transmitting data. In particular, this invention relates to a method for transmitting data that uses a plurality of transmitters to transmit their data to a receiver at different times within a transmission interval.

2. Description of the Related Art

As the car electronic technology has been developed, the tire pressure monitoring system (TPMS) becomes a popular device for the car. TPMS can immediately monitor and display the tire pressure and temperature. When the tire pressure is too high or too low, or the tire temperature is too high, TPMS informs the driver by a sound or light signal. Thus, the car is always assured to operate with correct tire pressure status.

The traditional TPMS uses a plurality of tire pressure transmitters to transmit tire pressure data to a remote receiver periodically during specific transmission intervals. Therefore, the driver obtains real time tire status, and danger is avoided.

In the traditional TPMS each transmitter usually transmits its tire pressure data at a predetermined transmission time within each transmission interval, the transmission time being different for each transmitter. Because the basic oscillation times of the tire pressure transmitters may differ slightly, the transmission intervals and the transmission times for each of the tire pressure transmitters may vary slightly over time.

Thus, after continuous operation of the TPMS, the transmitting times of the transmitters may drift in such a way that two transmitters repeatedly transmit their tire pressure data at the same time. The tire pressure receiver cannot simultaneously receive data from different transmitters and thus tire pressure data can be lost.

SUMMARY OF THE INVENTION

One particular aspect of the present invention is to provide a method for transmitting data that uses a plurality of transmitters to transmit their data to a receiver securely at different times. By excluding the possibility of simultaneous data transmission of the transmitters, the problem arising from the fact that the receiver cannot simultaneously receive data from different transmitters is overcome.

The method for transmitting data includes the following steps. Firstly, a plurality of transmitters respectively transmit their data to a receiver at different prime number times within a transmission interval. Next, these different prime number times are respectively added with different first accumulated values to become the different transmission times. The different first accumulated values are respectively added with a multiple of the different prime number times to become different second accumulated values. The transmitters respectively transmit a next data to the receiver within the next transmission interval at the different transmission times. The different transmission times are respectively added with the different second accumulated values to become the next different transmission times. The different second accumulated values are respectively added with a multiple of the different prime number times to become different third accumulated values. Finally, the transmitters respectively transmit a next data to the receiver within the next transmission interval at the next different transmission times.

The method for transmitting data uses a plurality of transmitters which transmit their data to a receiver at different transmission times within each transmission interval. Therefore, the problem of the data being transmitted at the same time as occurring in the traditional TPMS is solved. The receiver can receive all data exactly.

For further understanding of the invention, reference is made to the following detailed description illustrating the embodiments and examples of the invention. The description is only for illustrating the invention and is not intended to limit the scope of the claim.

BRIEF DESCRIPTION OF THE DRAWINGS

The drawings included herein provide a further understanding of the invention. A brief introduction of the drawings is as follows:

FIG. 3 is a time table of the tire pressure transmission times of an embodiment of the present invention.

DETAILED DESCRIPTION OF THE PREFERRED EMBODIMENTS

Figure 1:
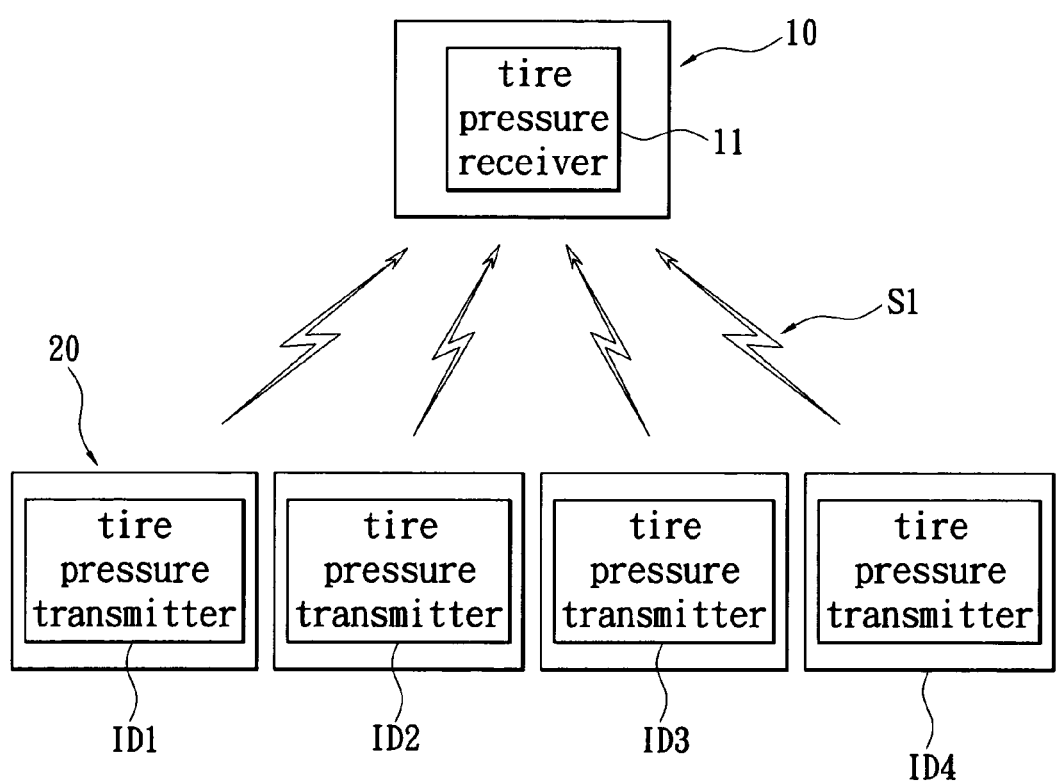
FIG. 1 is a block diagram of the tire pressure monitoring system being suitable for the present invention.

Reference is made to FIG. 1, which shows a block diagram of the tire pressure monitoring system being suitable for the present invention. The tire pressure monitoring system includes a tire pressure receiver 11 located in the car 10, and four tire pressure transmitters ID1~ID4 located at the tires 20. In FIG. 1, four tires 20 are used as the embodiment. Therefore, this embodiment has four tire pressure transmitters ID1~ID4. These four tire pressure transmitters ID1~ID4 respectively obtain the tire pressures from the four tires 20, and converts the tire pressures into tire pressure data S1. These four tire pressure transmitters ID1~ID4 have different identification codes and these identification codes are used for identify the tire pressure data S1.

In FIG. 1, the tire pressure transmitters ID1~ID4 respectively transmit tire pressure data S1 to the tire pressure receiver 11 at different transmission times within a transmission interval. At the next transmission interval, the tire pressure transmitters ID1~ID4 respectively transmit tire pressure data S1 to the tire pressure receiver 11 at different transmission times that are different from ones of the previous transmission interval.

Figure 2:
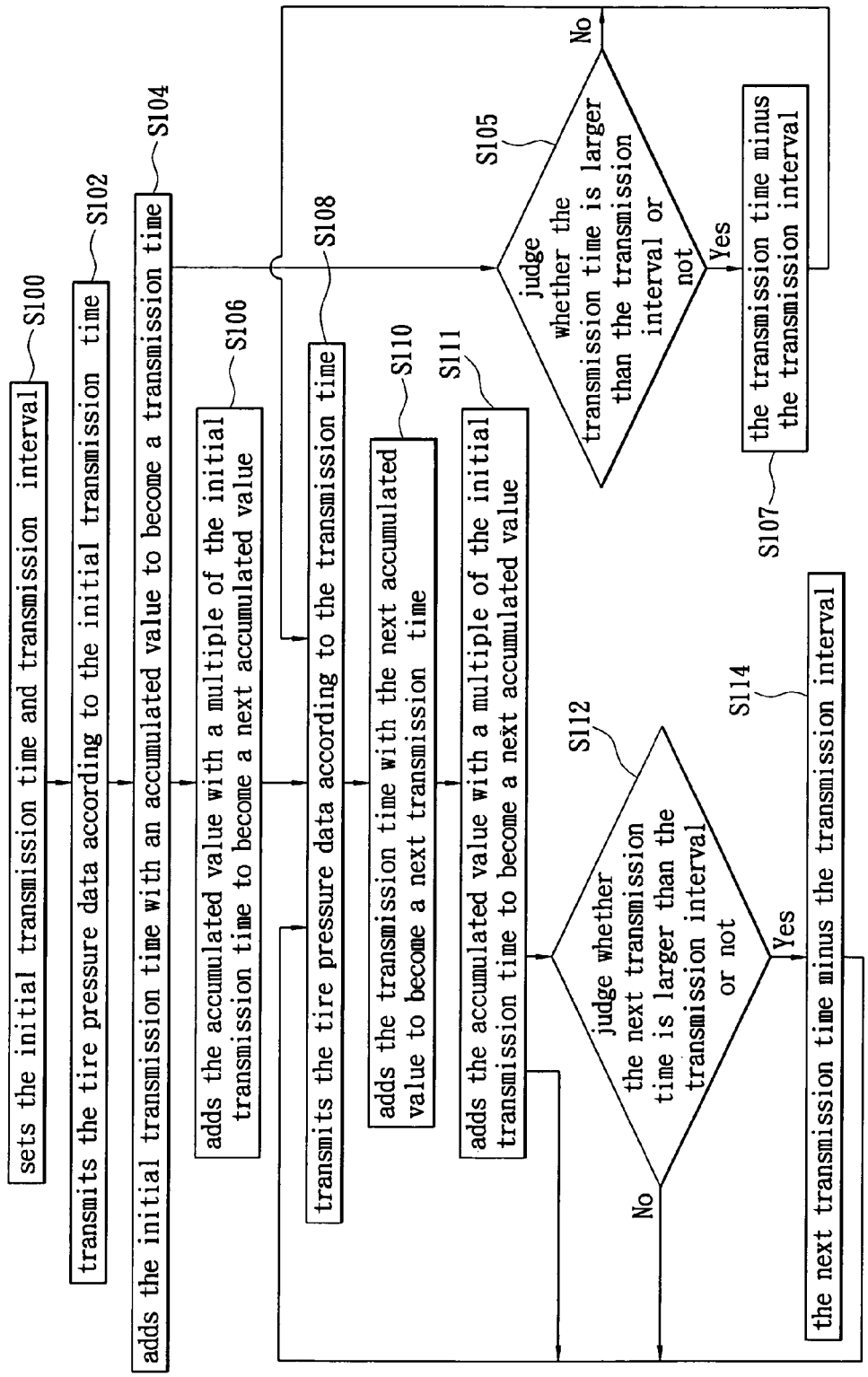
FIG. 2 is a flow chart of the method for transmitting tire pressure data of the present invention.

Reference is made to FIGS. 2 and 3. FIG. 2 is a flow chart of the method for transmitting tire pressure data of the present invention, and FIG. 3 is a time table of the tire pressure transmission times of an embodiment of the present invention.

The time table in FIG. 3 includes the transmission intervals T, the transmission times R and the accumulated values A for the tire pressure transmitters ID1~ID4. The transmission intervals T is two minutes (120 seconds), the initial transmission times R for the tire pressure transmitters ID1~ID4 are respectively 5, 7, 9, and 11 seconds. The initial accumulated times A1 are respectively 5, 7, 9, and 11 seconds. Reference is made to FIGS. 1, 2 and 3. The steps of the method for transmitting tire pressure data of the present invention is illustrated as below.

First, the transmission intervals T for the tire pressure transmitters ID1~ID4 and the initial transmission times R1 in the transmission intervals T are set in advance (S100). The initial transmission times R1 for the tire pressure transmitters ID1~ID4 are different and belong to the prime number. In this embodiment, the transmission intervals T for the tire pressure transmitters ID1~ID4 is 120 seconds, and the initial transmission times R are respectively 5, 7, 9, and 11 seconds. After step S100, the tire pressure transmitters ID1~ID4 orderly transmit a tire pressure data S1 to the tire pressure receiver 11 at the different prime number times (5, 7, 9 and 11 seconds) within the transmission interval T (120 seconds) (S102).

Next, the initial transmission times R1 (5, 7, 9 and 11 seconds) are respectively added with the different first accumulated values A1 to become the different transmission times R2 (S104). In this embodiment, the different first accumulated values A1 are respectively 5, 7, 9 and 11 seconds. Therefore, the different transmission times R2 are respectively 10, 14, 18 and 22 seconds. After step S104, the different first accumulated values A1 respectively added with one multiple of the initial transmission times R1 to become the different second accumulated values A2 (S106). In this embodiment, the different second accumulated values A2 are respectively 10, 14, 18 and 22 seconds. After step S106, the tire pressure transmitters ID1~ID4 orderly transmit a tire pressure data S1 to the tire pressure receiver 11 at the different transmission times R2 (10, 14, 18 and 22 seconds) within the transmission interval T (S108).

After step S104, a judging step (S105) is performed. The judging step S105 is used to determine whether the different transmission times R2 are larger than the transmission interval T or not. When the result of the judging step S105 is no, the step S108 is performed. When the result of the judging step S105 is yes, the different transmission times R2 respectively minus the transmission interval T (S107) so that the different transmission times R2 are smaller than the transmission interval T and the step S108 is performed.

After the step S108, the different transmission times R2 (10, 14, 18 and 22 seconds) are respectively added with the different second accumulated values A2 to become the next different transmission times R3 (S110). In this embodiment, the different second accumulated values A2 are respectively 10, 14, 18 and 22 seconds, and the next different transmission times R3 are respectively 20, 28, 36, and 44 seconds. After the step S110, the different second accumulated values A2 respectively added with one multiple of the initial transmission times R1 to become the different third accumulated values A3 (S110). In this embodiment, the different third accumulated values A3 are respectively 15, 21, 27, and 33 seconds. After step S111, the step S108 is performed. The tire pressure transmitters ID1~ID4 orderly transmit a tire pressure data S1 to the tire pressure receiver 11 at the different transmission times R3 (20, 28, 36 and 44 seconds) within the transmission interval T (S108).

Furthermore, after step S111, a judging step (S112) is also performed. The judging step S112 is used to determine whether the next different transmission times R3 are larger than the transmission interval T or not. When the result of the judging step S105 is no, the step S108 is performed. When the result of the judging step S105 is yes, the next different transmission times R3 respectively minus the transmission interval T (S114) so that the next different transmission times R3 are smaller than the transmission interval T and the step S108 is performed. The tire pressure data S1 are transmitted at different transmission times.

Reference is made to FIGS. 1, 2 and 3. When the method for transmitting tire pressure data of the present invention transmits the tire pressure data S1 at the first time, the tire pressure transmitter ID1 transmits the tire pressure data S1 at 5 seconds, the tire pressure transmitter ID2 transmits the tire pressure data S1 at 7 seconds, the tire pressure transmitter ID3 transmits the tire pressure data S1 at 9 seconds, and the tire pressure transmitter ID4 transmits the tire pressure data S1 at 11 seconds.

When the tire pressure data S1 are transmitted at the second time, the previous transmission time (5 seconds) added the accumulated value (5 seconds) are equal to 10 seconds. This means that Therefore, the tire pressure transmitter ID1 transmits the tire pressure data S1 at 10 seconds. Similarly, the tire pressure transmitters ID2, ID3 and ID4 respectively transmit the tire pressure data S1 at 14, 18, and 22 seconds. Therefore, from FIG. 3, the transmission times R for the tire pressure transmitters ID1, ID2, ID3 and ID4 are different. The problem of the data being transmitted at the same time due to the transmission times are overlapped for the traditional TPMS is solved. The tire pressure receiver can exactly receive all tire pressure data.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A method for transmitting data, from a plurality of transmitters to a receiver comprising:
   respectively transmitting first data from the plurality of transmitters to the receiver at transmission times in terms of different prime numbers within a transmission interval;
   respectively adding a multiplication of a predetermined multiplier multiplying the transmission times in terms of the different prime numbers and corresponding predetermined different first accumulated values together to derive different second accumulated values for the transmitters;
   respectively transmitting second data from the transmitters to the receiver at transmission times in terms of the different second accumulated values within the transmission interval;
   respectively adding the different transmission times in terms of the different second accumulated values and the corresponding different second accumulated values together to derive different third accumulated values for the transmitters; and
   respectively transmitting third data from the transmitters to the receiver at transmission times in terms of the different third accumulated values within the transmission interval.

2. The method for transmitting data as claimed in claim 1, further comprising a step of determining whether the different transmission times in terms of the different second accumulated values and the different transmission times in terms of the different third accumulated values are within the transmitting interval.

3. The method for transmitting data as claimed in claim 2, wherein the different transmission times in terms of the second accumulated values and the different transmission times in terms of the third accumulated values respectively minus the transmission interval when the different transmission times in terms of the second accumulated values and the different transmission times in terms of the third accumulated values are outside the transmission interval.

4. The method for transmitting data as claimed in claim 1, wherein the transmitters are associated with different identification codes for identifying the first data, the second data, and the third data.

5. The method for transmitting data as claimed in claim 1, wherein the different first accumulated values are respectively equal to the different prime numbers.

6. The method for transmitting data as claimed in claim 1, wherein the first data, the second data, and the third data are tire pressure data.

7. A method for transmitting data, from a plurality of transmitters to a receiver, comprising:
respectively transmitting first data from the transmitters to the receiver at different first transmission times within a transmission interval;
respectively adding the different first transmission times and different accumulated values together to derive different second transmission times;
respectively adding the different accumulated values and a multiplication of a predetermined multiplier multiplying the different first transmission times together; and
respectively transmitting second data from the transmitters to the receiver at the different second transmission times within the transmission interval.

8. The method for transmitting data as claimed in claim 7, wherein the first transmission times are set to different prime numbers.

9. The method for transmitting data as claimed in claim 7, further comprising a step of determining whether the different second transmission times are within the transmission interval.

10. The method for transmitting data as claimed in claim 9, wherein the different second transmission times respectively minus the transmission interval when the different second transmission times are outside the transmission interval.

11. The method for transmitting data as claimed in claim 7, wherein the transmitters are associated with different identification codes, respectively, for identifying the first data and the second data.

12. The method for transmitting data as claimed in claim 7, wherein the different accumulated values are respectively equal to the different first transmission times.

13. The method for transmitting data as claimed in claim 7, wherein the first data and the second data are tire pressure data.

* * * * *